US009395010B2

(12) United States Patent  
Jamison et al.

(10) Patent No.: US 9,395,010 B2
(45) Date of Patent: *Jul. 19, 2016

(54) MULTI-PORT MODULAR VALVE WITH SNAP-IN SEAT

(71) Applicant: MAC Valves, Inc., Wixom, MI (US)

(72) Inventors: Michael Jamison, Fenton, MI (US); Jeffrey Simmonds, Commerce Township, MI (US); Kevin C. Williams, Wixom, MI (US)

(73) Assignee: MAC Valves, Inc., Wixom, MI (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/336,353

(22) Filed: Jul. 21, 2014

(65) Prior Publication Data

US 2014/0332093 A1 Nov. 13, 2014

Related U.S. Application Data

(63) Continuation of application No. 13/724,138, filed on Dec. 21, 2012, now Pat. No. 8,783,653.

(51) Int. Cl.
| | |
|---|---|
| *F16K 31/02* | (2006.01) |
| *F16K 27/02* | (2006.01) |
| *F16K 1/42* | (2006.01) |
| *F16K 31/06* | (2006.01) |

(52) U.S. Cl.
CPC . *F16K 27/02* (2013.01); *F16K 1/42* (2013.01); *F16K 27/029* (2013.01); *F16K 31/02* (2013.01); *F16K 31/0658* (2013.01); *F16K 31/0675* (2013.01); *Y10T 137/6011* (2015.04); *Y10T 137/86574* (2015.04)

(58) Field of Classification Search
CPC ....... H01F 7/126; H01F 7/127; H01F 7/1607; F16K 31/0655
USPC ........................ 251/129.18, 129.15
See application file for complete search history.

(56) References Cited

U.S. PATENT DOCUMENTS

| | | | | |
|---|---|---|---|---|
| 4,254,938 A | * | 3/1981 | Inada et al. | 251/367 |
| 4,257,573 A | * | 3/1981 | Stampfli | 251/30.01 |
| 5,060,695 A | * | 10/1991 | McCabe | 137/625.61 |
| 6,854,706 B2 | * | 2/2005 | Sato et al. | 251/129.15 |
| 7,004,450 B2 | * | 2/2006 | Yoshimura et al. | 251/129.15 |
| 8,123,193 B2 | * | 2/2012 | Kratzer | 251/129.18 |
| 2009/0189105 A1 | * | 7/2009 | Dayton | 251/129.15 |

* cited by examiner

*Primary Examiner* — R. K. Arundale
(74) *Attorney, Agent, or Firm* — Harness, Dickey & Pierce, P.L.C.

(57) ABSTRACT

A solenoid operated modular valve includes a solenoid body having a coil and a pole piece positioned in the solenoid body. A valve body cartridge is connected to the solenoid body. A polymeric snap-in seat assembly includes first and second deflectable claw arms each having a barb engaging the valve body cartridge retaining the snap-in seat assembly in direct contact with the valve body cartridge. A seat engagement face when contacted by a valve seal member defines a valve closed position, and is displaced away from the seat engagement face in a valve open position when the coil is energized. A valve body cartridge body end portion includes a barb engagement face having pitched contact edges each having a continuous pitch directly contacted by the barb of the first and second deflectable claw arms to rotatably and frictionally lock the snap-in seat assembly to the valve body cartridge.

24 Claims, 8 Drawing Sheets

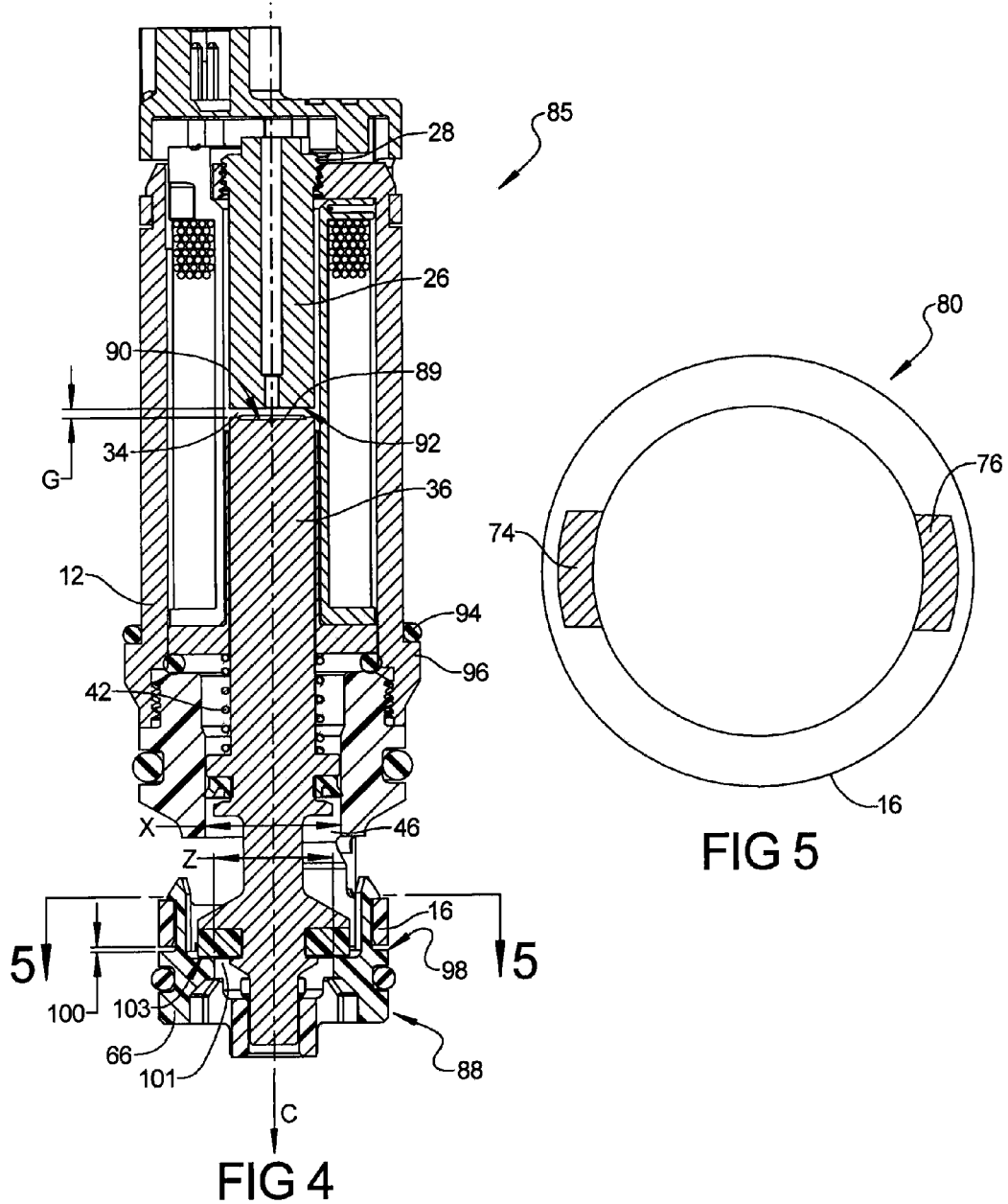

MULTI-PORT MODULAR VALVE WITH SNAP-IN SEAT

CROSS-REFERENCE TO RELATED APPLICATIONS

This application is a continuation application of U.S. patent application Ser. No. 13/724,138 filed on Dec. 21, 2012. The entire disclosure of the above application is incorporated herein by reference.

FIELD

The present disclosure relates to solenoid operated poppet valves.

BACKGROUND

This section provides background information related to the present disclosure which is not necessarily prior art.

Solenoid operated valves such as poppet valves are known which provide control of a fluid such as pressurized air in operating additional equipment such as sorters, packaging machines, food processors, and the like. These valves may be operated for millions of cycles. In order to retain the solenoid operated valve in a closed position when the solenoid is de-energized, biasing members such as springs are used. It is also known, for example in U.S. Pat. No. 4,598,736 to Chorkey, that fluid pressure can be balanced within the valve to reduce a solenoid force required to move a valve member between closed and open positions.

Direct access to the valve seat area in known valves is generally not available. When wear of the valve member or seat occurs, known valve designs either require the entire valve to be disassembled or the valve is entirely replaced. Valve designs having snap-in component parts for easier access to valve components are known, but do not provide flexibility in changing valve operating characteristics.

SUMMARY

This section provides a general summary of the disclosure, and is not a comprehensive disclosure of its full scope or all of its features.

According to several aspects, a solenoid operated modular valve includes a solenoid body having a coil and a pole piece positioned in the solenoid body. A polymeric material valve body cartridge is releasably connected to the solenoid body.

An armature/valve member is slidably disposed in both the solenoid body and the valve body cartridge. The armature/valve member is displaced toward the pole piece when the coil is energized.

A polymeric snap-in seat assembly includes: first and second deflectable claw arms each having a barb engaging the valve body cartridge to retain the snap-in seat assembly in direct contact with the valve body cartridge; a guide tube slidably receiving a valve member guide of the armature/valve member; and a biasing member acting to normally bias the armature/valve member toward the snap-in seat assembly and acting to create a clearance gap between the snap-in seat assembly and the valve body cartridge in a non-installed condition of the modular valve.

According to other aspects, a solenoid operated modular valve includes a solenoid body having a coil and a pole piece positioned in the solenoid body. A polymeric material valve body cartridge is releasably connected to the solenoid body. A polymeric snap-in seat assembly includes first and second deflectable claw arms each having a barb engaging the valve body cartridge to retain the snap-in seat assembly in direct contact with the valve body cartridge. A seat engagement face when contacted by a valve seal member defines a valve closed position. The valve seal member is displaced away from the seat engagement face in a valve open position when the coil is energized. A body end portion of the modular valve body cartridge includes a barb engagement face having pitched contact edges, the pitched contact edges each having a continuous pitch directly contacted by the barb of each of the first and second deflectable claw arms to rotatably and frictionally lock the snap-in seat assembly to the valve body cartridge.

According to further aspects, a solenoid operated modular valve includes a solenoid body having a coil and a pole piece positioned in the solenoid body and a polymeric material valve body cartridge releasably connected to the solenoid body. An armature/valve member slidably disposed in both the solenoid body and the valve body cartridge is displaced toward the pole piece when the coil is energized. A polymeric snap-in seat assembly includes first and second deflectable claw arms each having a barb engaging the valve body cartridge to retain the snap-in seat assembly in direct contact with the valve body cartridge. A guide tube slidably receiving a valve member guide of the armature/valve member. A seat engagement face when contacted by a valve seal member supported on the armature/valve member defines a valve closed position. The valve seal member is displaced away from the seat engagement face in a valve open position when the coil is energized. A biasing member normally biases the armature/valve member toward the snap-in seat assembly seat engagement face and creates a clearance gap between the snap-in seat assembly and the valve body cartridge in a non-installed condition of the modular valve.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a cross sectional side elevational view similar to FIG. 2 for another embodiment of a multi-port modular valve;

FIG. 5 is a cross sectional top plan view taken at section 5 of FIG. 4;

Corresponding reference numerals indicate corresponding parts throughout the several views of the drawings.

DETAILED DESCRIPTION

Example embodiments will now be described more fully with reference to the accompanying drawings.

Figure 1:
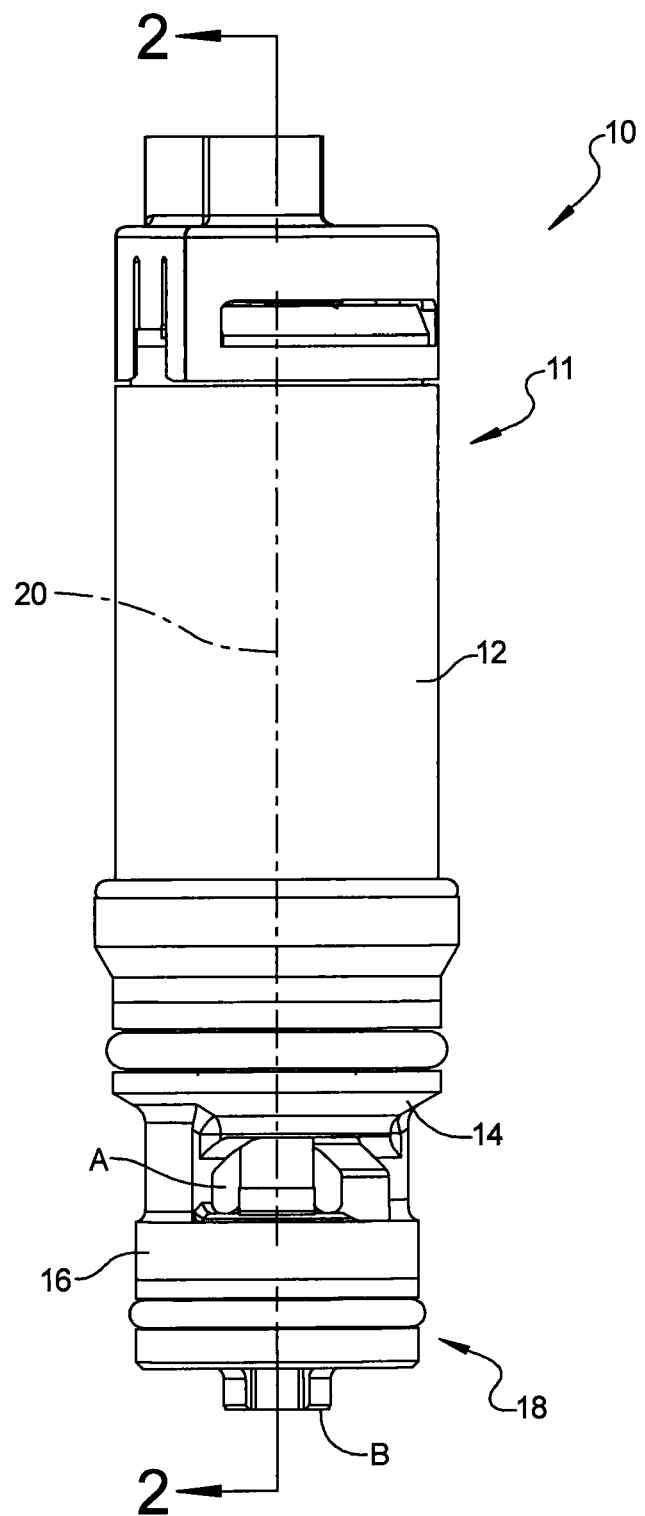
FIG. 1 is a front elevational view of a multi-port modular valve with a snap-in seat of the present disclosure.

Referring to FIG. 1, a modular valve 10 includes a solenoid valve operator 11 having a solenoid body 12 releasably connected to a valve body cartridge 14. Valve body cartridge 14 includes a body end portion 16 where a snap-in seat assembly 18 is releasably connected thereto such that the snap-in seat assembly 18, the body end portion 16, the valve body cartridge 14, and the solenoid body 12 are all coaxially aligned with respect to a valve central longitudinal axis 20. Once assembled having the snap-in seat assembly 18 received as shown, modular valve 10 provides an inlet port "A" and an outlet port "B".

Figure 2:
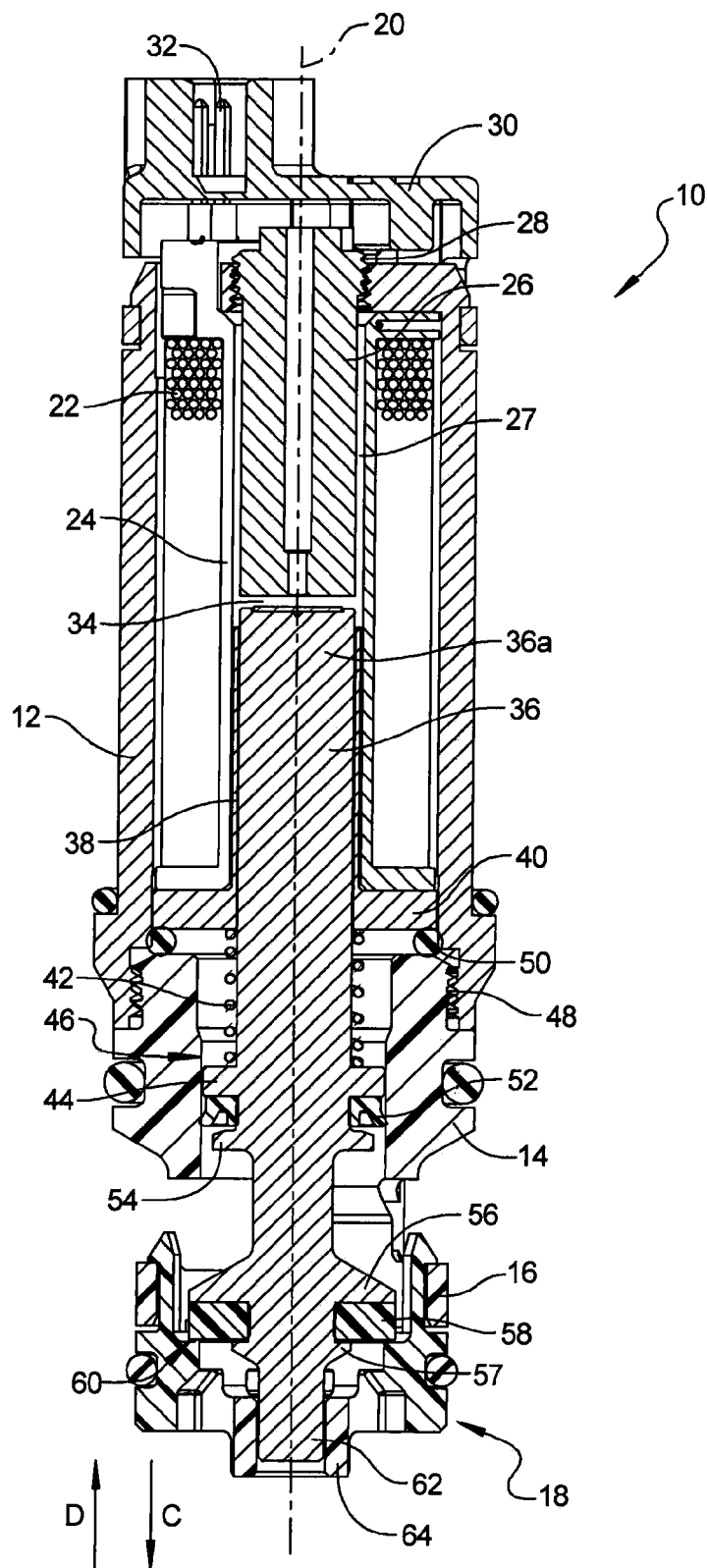
FIG. 2 is a cross sectional side elevational view taken at section 2 of FIG. 1.

Referring to FIG. 2, modular valve 10 further includes a coil 22 assembled about a bobbin 24, with a normally stationary pole piece 26 positioned within the bobbin 24. The pole piece 26 is adjustable with respect to the valve central longitudinal axis 20 by rotating pole piece 26 with respect to pole piece threads 28 engaging pole piece 26 to an upper end of solenoid body 12 such that an axial position of pole piece 26 is adjustable within a cylindrical bore 27 defined by the bobbin 24.

An electrical connection cover 30 is releasably connected to the solenoid body 12 which includes multiple electrical contacts 32 such that electrical energy can be provided to the coil 22. When modular valve 10 is in the normally closed position shown, a clearance gap 34 is provided between the pole piece 26 and an armature/valve member 36. Armature/valve member 36 homogeneously includes an armature portion 36a which is slidably disposed within an armature sleeve 38. Armature sleeve 38 is positioned within the cylindrical bore 27 of bobbin 24 and is provided to maintain coaxial alignment of armature/valve member 36 during sliding displacement between a valve closed and a valve open position. Armature sleeve 38 is integrally connected to an armature sleeve flange 40 which extends transversely with respect to valve central longitudinal axis 20.

A biasing member 42 such as a coiled spring, is positioned about an outer diameter portion of armature/valve member 36 below armature sleeve flange 40. A first end of the biasing member 42 is positioned in direct contact with the armature sleeve flange 40 and an opposite second end is in direct contact with a valve member piston 44 which is integral portion of armature/valve member 36. The biasing member 42 provides a continuous biasing force acting to displace the armature/valve member 36 in a valve closing direction "C". The valve member piston 44 is slidably disposed within a piston cavity 46 created in valve body cartridge 14.

The valve body cartridge 14 according to several embodiments is created of a polymeric material and is releasably, threadably connected to the solenoid body 12 using valve body threads 48. A polymeric material is used for valve body cartridge 14 for multiple reasons, including: to reduce cost and weight of modular valve 10; to permit the complex geometry of valve body cartridge 14 to be more easily manufactured using a molding operation; to reduce or eliminate corrosion of the valve body cartridge 14 in an installed position of modular valve 10; and to eliminate any effects of the magnetic field on the valve body cartridge 14 during operation of coil 22. A valve body seal member 50, such as an O-ring or D-ring, is provided in contact between valve body cartridge 14, solenoid body 12, and armature sleeve flange 40. Valve body seal member 50 provides an atmospheric seal for modular valve 10. To further prevent a fluid such as air which is controlled by operation of modular valve 10 from entering the area of the coil 22, a seal member 52 such as a soft rubber or similar material member, is positioned in contact with a wall of piston cavity 46 as valve member piston 44 slidably displaces within piston cavity 46. Seal member 52 is retained in position by direct contact with each of the valve member piston 44 and a valve member seal retainer 54 which is also an integral extension of the armature/valve member 36.

To provide a normal fluid seal boundary for the fluid controlled by operation of modular valve 10 between the inlet and outlet ports, a valve seal member 58 is retained between and in direct contact with a first valve member seal retention flange 56 and a second valve member seal retention flange 57 both integrally connected to and extending radially outwardly from armature/valve member 36. Valve seal member 58 can be made of a soft material such as rubber or similar seal material. During normal operating conditions, with the coil 22 in a de-energized condition, the valve seal member 58 will directly contact a seat engagement face 60 provided with snap-in seat assembly 18.

To provide sliding alignment of armature/valve member 36 during valve operation, the armature/valve member 36 further integrally includes a valve member guide 62 defining a free end of the armature/valve member 36. The valve member guide 62 is substantially circular in cross-section and is slidably received in a guide tube 64 integrally provided with the snap-in seat assembly 18. To displace the armature/valve member 36 from the seated position shown to a valve open position (shown and described in better detail in reference to FIG. 6), electrical energy is provided to coil 22 with creates a magnetic field acting through pole piece 26 which magnetically attracts the armature/valve member 36 in a valve opening direction "D" toward the pole piece 26. The magnetic field provided via the coil 22 through pole piece 26 overcomes the biasing force of biasing member 42. As long as electrical energy is provided to coil 22, the armature/valve member 36 will be held at the valve open position allowing fluid flow through modular valve 10.

Figure 3:
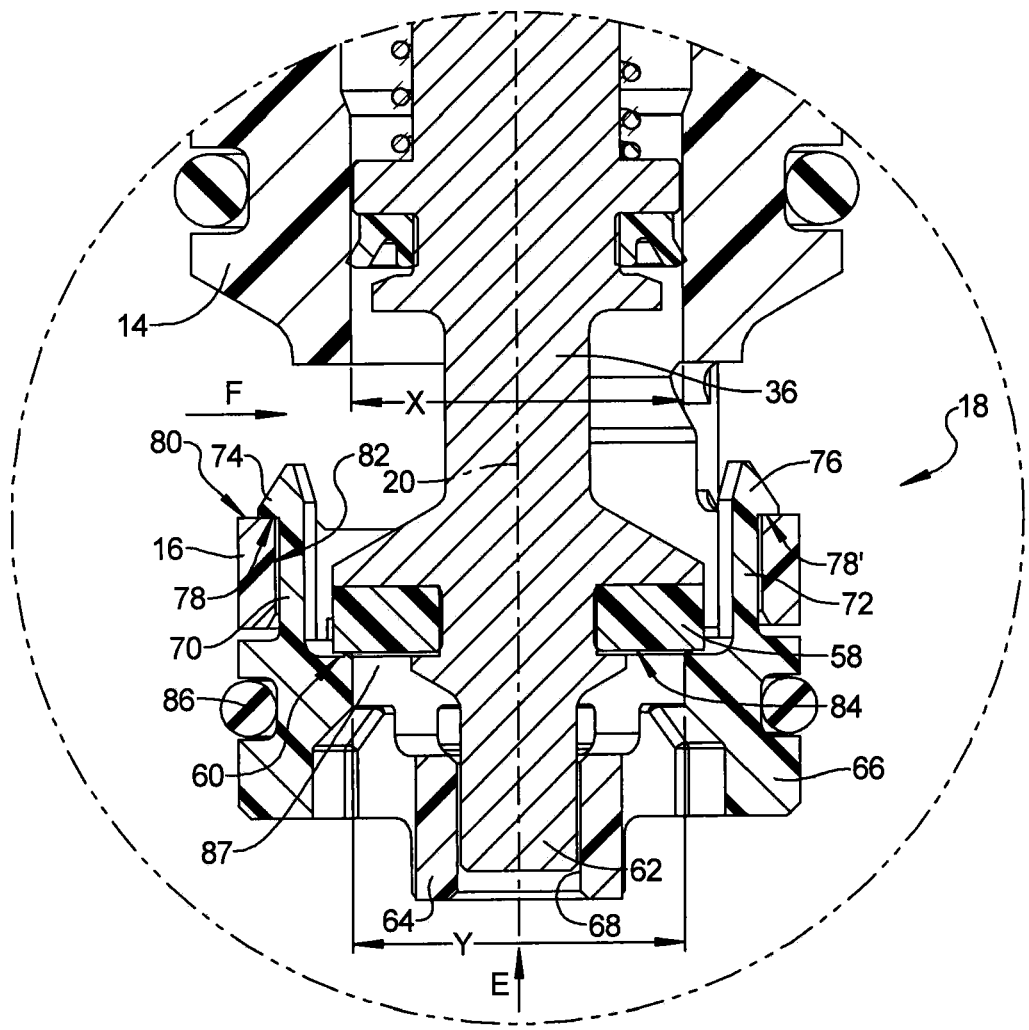
FIG. 3 is a cross sectional side elevational view taken at area 3 of FIG. 2.

Referring to FIG. 3, snap-in seat assembly 18 further includes a seat assembly body 66 which has the guide tube 64 extending therefrom. The guide tube 64 defines a guide tube bore 68 within which the valve member guide 62 is slidably displaced. Oppositely directed with respect to guide tube 64 are each of a first claw arm 70 and a second claw arm 72 which are integral extensions of the seat assembly body 66. The first claw arm 70 includes a first barb 74 and the second claw arm 72 includes a second barb 76. The first and second barbs are directed outwardly and are therefore oppositely directed with respect to each other. Each of the first and second barbs 74, 76 includes a barb flat 78, 78' which is oriented transversely with respect to valve central longitudinal axis 20 when the snap-in seat assembly 18 is positioned in its installed condition. Each of the barb flats 78, 78' directly contacts a planar barb engagement surface 80 which is created on the body end portion 16.

The snap-in seat assembly 18 is installed by displacing the snap-in seat assembly 18 in a seat assembly installation direction "E", which initially inwardly deflects each of the first and second claw arms 70, 72 as the first and second barbs 74, 76 directly contact an end portion inner wall 82 of body end portion 16. Both of the first and second barbs 74, 76 eventually reach a position where the barb flats 78, 78' extend above the planar barb engagement surface 80, which thereby allows the biasing force created by inward deflection of the first and second claw arms 70, 72 to return the first and second claw arms 70, 72 radially outward with respect to valve central longitudinal axis 20. This outward motion engages the barb flats 78, 78' in direct contact with the planar barb engagement surface 80. In the engaged position, the first and second barbs 74, 76 releasably retain the snap-in seat assembly 18 with respect to the body end portion 16. As the snap-in seat assembly 18 reaches the fully installed position, a seal member end face 84 of the valve seal member 58 can directly contact the seat engagement face 60 of the snap-in seat assembly 18.

A seat assembly seal member 86, such as an O-ring or D-ring provides for additional fluid boundary containment. Seat assembly seal member 86 is positioned in an externally provided slot created in the seat assembly body 66. The function and operation of seat assembly seal member 86 will be described in greater detail in reference to FIG. 6. It is noted that the first and second claw arms 70, 72 are positioned diametrically opposite with respect to each other such that during installation, each of the first and second claw arms 70, 72 are forced toward the valve central longitudinal axis 20, for example in an inward deflection direction "F" as shown with respect to first claw arm 70. The amount of elastic deflection of the first and second claw arms 70, 72 is intended to be substantially equal during the installation phase.

Referring to FIG. 4, a modular valve 85 is modified from modular valve 10 to include a modified snap-in seat assembly 88 having a smaller diameter outlet port 101. The other components of modular valve 10 and of snap-in seat assembly 18 are substantially unchanged. To reduce the possibility of tapping or contact noise as the armature/valve member 36 rapidly displaces between valve closed and valve open positions, a cushion member 89, made for example of a rubber or similar resilient material, is positioned between an armature end face 90 and a pole piece end face 92. The cushion member 89 is softer than the material of the armature/valve member 36 and pole piece 26 and therefore substantially eliminates direct metal-to-metal contact between armature/valve member 36 and pole piece 26, and further reduces the potential for wear at armature end face 90 and pole piece end face 92. With the cushion member 89 in position as shown, by adjusting the axial position of pole piece 26 using pole piece threads 28, a valve stroke length "G" is established. The valve stroke length "G" can be modified to accommodate wear of cushion member 89, or to change the operating characteristics of modular valve 10 such as its opening and closing time, its maximum time in an open condition, or further operating characteristics.

In addition to the seal members previously described herein, a body positioning member 94 such as an O-ring or a D-ring is positioned about a circumference of solenoid body 12 and in direct contact with a solenoid body flange 96. Solenoid body flange 96 extends outwardly with respect to solenoid body 12. The purpose of body positioning member 94 will be described in greater detail in reference to FIG. 6.

With continuing reference to both FIGS. 3 and 4, when the snap-in seat assembly 18 or 88 is initially installed in body end portion 16, the biasing force of biasing member 42 will normally act in the valve closing direction "C" providing a snap-in seat clearance gap 100 between a seat assembly end face 98 of seat assembly body 66 and the body end portion 16. Evidence of snap-in seat clearance gap 100 having an equal clearance about the circumference of the snap-in seat assembly after assembly but prior to installation of the modular valve provides visual confirmation the modular valve has been assembled correctly with both snap-in seat assembly 18 or 88 barbs correctly seated. Snap-in seat clearance gap 100 will be substantially eliminated or reduced to zero when modular valve 10 or 85 is installed in its final installation position within a manifold, which will be described in reference to FIG. 6.

With continuing reference to FIGS. 3 and 4, several advantages of using snap-in seat assemblies 18 or 88 of the present disclosure include the ability to change the operation of from a pressure balanced valve (modular valve 10) to a non-pressure balanced operating valve (modular valve 85). For example, according to several aspects, and referring again to FIG. 3, modular valve 10 operates as a pressure balanced valve when a diameter "X" of piston cavity 46 is substantially equal to a diameter "Y" of an outlet port 87 isolated by valve seal member 58 when valve seal member 58 is in contact with seat engagement face 60. Substantially equal and opposite fluid pressure therefore acts against valve member piston 44 and against seal retention flange 56 and valve seal member 58 in the valve closed position, such that the magnetic force created by energizing coil 22 acting through pole piece 26 only has to overcome the biasing force of biasing member 42 to open modular valve 10. In contrast, and referring again to FIG. 4, modular valve 85 operates as an un-balanced pressure valve when the diameter "X" of piston cavity 46 is greater than a diameter "Z" of a smaller diameter port 101 of snap-in seat assembly 88 which is isolated by valve seal member 58 when valve seal member 58 is in contact with a seat engagement face 103 of snap-in seat assembly 88. A greater fluid pressure acts against valve member piston 44 than against seal retention flange 56 and valve seal member 58 in the valve closed position of modular valve 85. This allows the operator to change the operating conditions such as the valve opening time or to increase the pressure force acting to retain modular valve 85 in the valve closed position compared to modular valve 10.

Referring to FIG. 5, the overlap of the first and second barbs 74, 76 is shown with respect to planar barb engagement surface 80 of body end portion 16. It is noted that the position of the first and second barbs 74, 76 can contact substantially at any position about the circumference of body end portion 16. There is therefore no limitation on the installer of snap-in seat assembly 18 to locate or adhere to a specific installed position of snap-in seat assembly 18. The snap-in seat assembly 18 installed position is therefore not limited by the installer's selected installed position.

Figure 6:
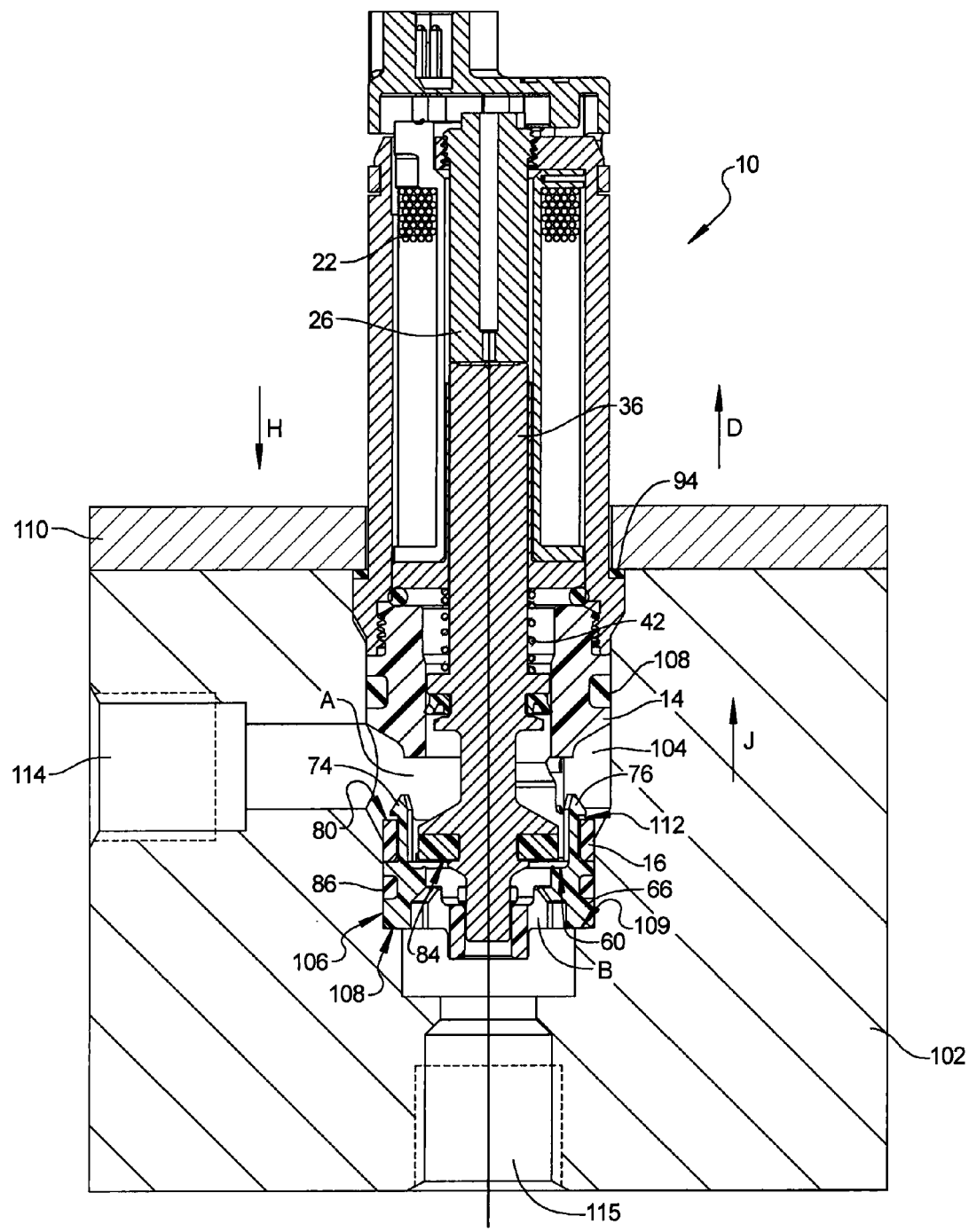
FIG. 6 is a cross sectional side elevational view similar to FIG. 2 of the valve installed in an exemplary manifold, with the valve further shown in a valve open position.

Referring to FIG. 6, modular valve 10 is shown in an installed position in a block or manifold 102, with modular valve 10 further shown in the valve open position. Modular valve 85 (not shown) would be installed in a similar manner. Initially, the valve body cartridge 14 is slidably inserted in a first manifold bore 104 of manifold 102. At the same time, the seat assembly body 66 is slidably received in a smaller diameter second manifold bore 106. A seal member, such as an O-ring or D-ring 108, positioned in a circumferential slot created in valve body cartridge 14, abuts against an inner wall of the first manifold bore 104. Similarly, the seat assembly seal member 86 also abuts against an inner wall of the second manifold bore 106 to create a fluid seal. A seat body end face 108 of the seat assembly body 66 is displaced into the second manifold bore 106 until the seat body end face 108 directly contacts a manifold bore end face 109. This direct contact is maintained by a biasing force created as the body positioning member 94 is partially compressed by contact from a hold-down plate 110 which is mechanically connected to manifold 102.

With continuing reference to FIGS. 4 and 6, the snap-in seat gap 100 is eliminated when direct contact occurs between the seat body end face 108 and the manifold bore end face 109 such that a barb clearance gap 112 is created between the first and second barbs 74, 76 and the body end portion 16. Barb clearance gap 112 is created by the upward displacement of the first and second barbs 74, 76 and snap-in seat assembly 18 or 88 in a body displacement direction "J" as the body end portion 16 is inserted into the second manifold bore 106 and by subsequent installation of the hold-down plate 110 in a hold-down plate installation direction "H".

In the valve open position shown in FIG. 6, the biasing force of biasing member 42 is overcome by the magnetic force acting through pole piece 26 when coil 22 is energized, which pulls armature/valve member 36 in the valve opening direction "D". Seal member end face 84 moves away from seat engagement face 60, thereby providing a flow path from the inlet port "A" to the outlet port "B". The inlet port "A" is aligned with a manifold inlet passage 114 which are both open with respect to the outlet port "B" and a manifold outlet passage 115 which is aligned with outlet port "B". Flow through the manifold 102 will therefore be from manifold inlet passage 114 via inlet port "A", out through outlet port "B" and manifold outlet passage 115 when modular valve 10 (or modular valve 85) is energized.

Figure 7:
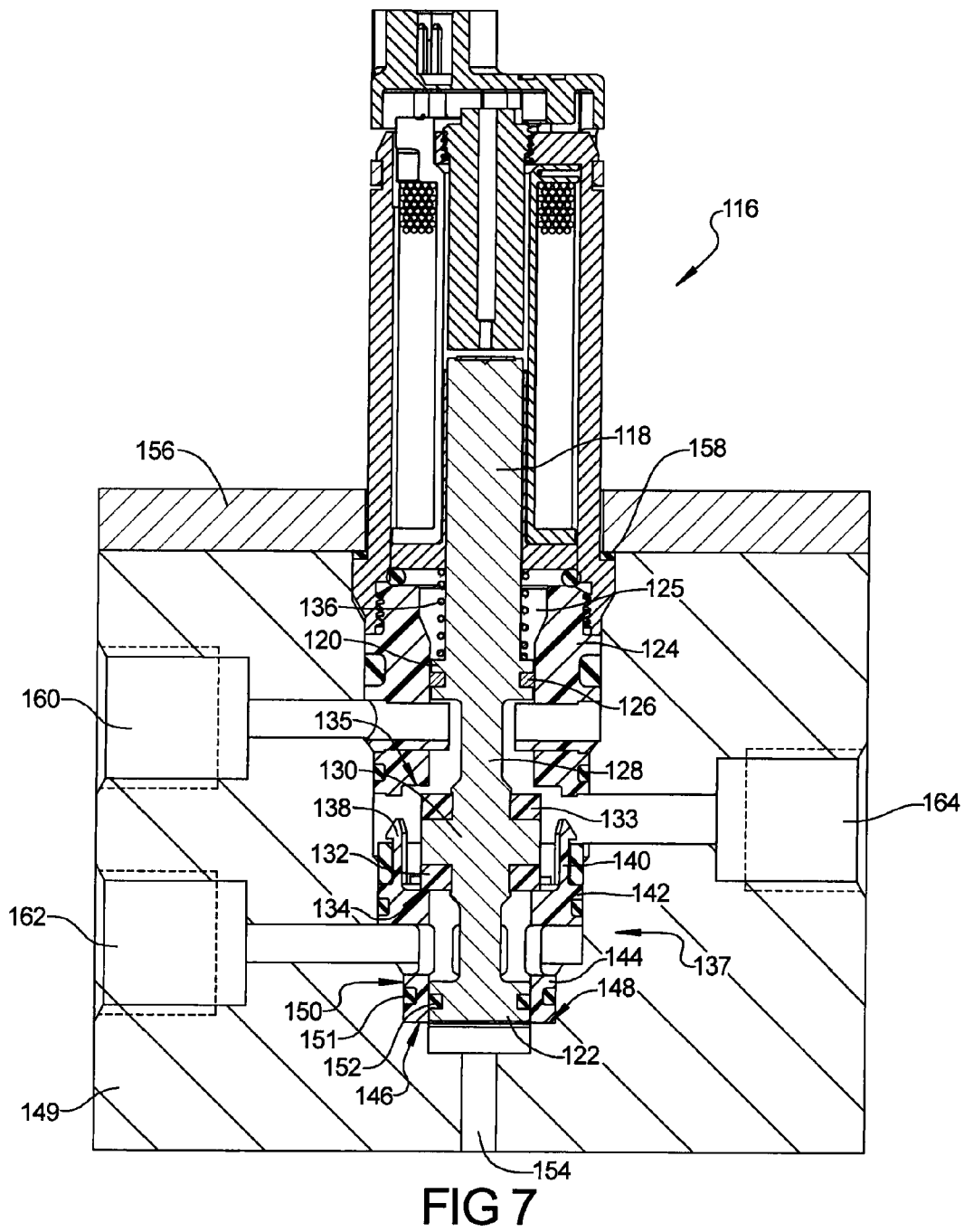
FIG. 7 is a cross sectional side elevational view similar to FIG. 6 of a further embodiment of a 3-way modular valve of the present disclosure.

Referring to FIG. 7, according to additional aspects, a three-way modular valve 116 is shown having a snap-in seat assembly modified from the snap-in seat assembly 18 previously described herein. Three-way modular valve 116 includes an armature/valve member 118 which has each of a first valve member piston 120 and a second valve member piston 122. The first valve member piston 120 is slidably disposed in a valve body cartridge 124 in the location of a first cartridge bore 125. A seal member 126, such as an O-ring or D-ring, is provided with the first valve member piston 120 to provide a fluid boundary seal for first cartridge bore 125 as the first valve member piston 120 displaces between valve closed and valve open positions. Positioned between the first valve member piston 120 and the second valve member piston 122 is a valve member extension 128 which integrally provides a valve member seal retention flange 130 radially extending outwardly therefrom. A first valve seal member 132 and a second valve seal member 133, made from a resilient or rubber material, are oppositely positioned with respect to valve member seal retention flange 130. In the valve closed position, the first valve seal member 132 is in direct contact with a seat engagement face 134 and held by the biasing force of a biasing member 136, such as a coiled spring. In the valve open position (not shown), the second valve seal member 133 is in direct contact with an opposite seat engagement face 135 and held by the magnetic force created by energizing coil 22.

Similar to snap-in seat assembly 18, a snap-in seat assembly 137 provides the seat engagement face 134 as well as opposed first and second claw arms 138, 140 which operate in a similar manner as previously described with respect to first and second claw arms 70, 72. The snap-in seat assembly 137 includes a seat assembly body 142 from which the first and second claw arms 138, 140 integrally extend. The seat assembly body 142 further includes a seat body lower portion 144 which slidably receives the second valve member piston 122. When the three-way modular valve 116 is in its fully installed position shown, a lower portion end face 146 of the seat body lower portion 144 is in direct contact with a manifold bore end face 148 of a manifold 149. The seat body lower portion 144 is positioned within a second manifold bore 150 of manifold 149 and sealed therein using a seal member 151, such as an O-ring or D-ring. The second valve member piston 122 is slidably sealed within the seat body lower portion 144 using a seal member 152, such as an O-ring or D-ring. To allow axial displacement of second valve member piston 122, the manifold 149 is provided with a vent passage 154 aligned with second valve member piston 122 which is open to the atmosphere.

Similar to modular valves 10 and 85, installation of three-way modular valve 116 proceeds by installing the valve body cartridge 124 into the first cartridge bore 125 and the second manifold bore 150. A hold-down plate 156 directly contacts and partially compresses a body positioning member 158, such as an O-ring or D-ring, which functions similar to body positioning member 94 such that in the fully installed position of three-way modular valve 116, the barbs of the first and second claw arms 138, 140 are displaced freely away from contact with a lower portion of valve body cartridge 124. In the installed position and in the valve normally closed position, a body exhaust port 160 is aligned with a body outlet port 164 and a body inlet port 162 is isolated from both of the body exhaust port 160 and body outlet port 164. When three-way modular valve 116 is energized, the armature/valve member 118 is displaced to a valve open position which aligns the body inlet port 162 with the body outlet port 164 while the body exhaust port 160 is isolated.

Figure 8:
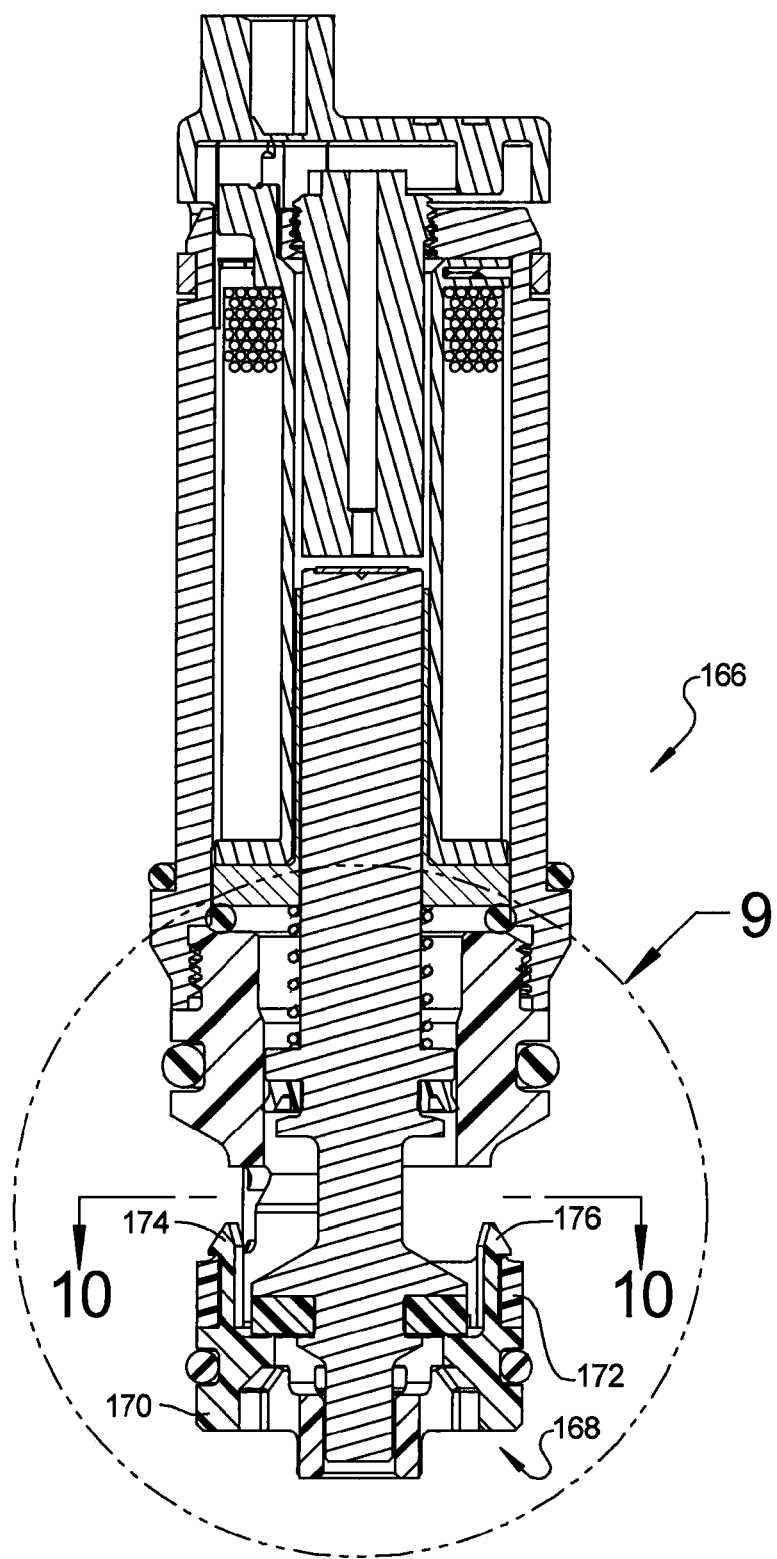
FIG. 8 is a cross sectional side elevational view similar to FIG. 2 of a modular valve modified to include a seat assembly locking feature.

Referring to FIG. 8, according to further aspects, a modular valve 166 is further modified to provide a rotate-to-lock position for a snap-in seat assembly 168. The snap-in seat assembly 168, when assembled and rotated to the locked position, will therefore no longer be axially displaceable, unlike the previous embodiments described herein. The snap-in seat assembly 168 is provided with a seat assembly body 170 which directly contacts a body end portion 172 at each of a first claw arm 174 and a second claw arm 176, similar to those previously described herein.

Referring to FIG. 9 and again to FIG. 8, each of the first and second claw arms 174, 176 is provided with a barb 178, 178' which are oppositely directed with respect to each other. Each barb 178, 178' is provided with a barb flat 180, 180'. The body end portion 172 of modular valve 166 is modified to provide a barb engagement face 182 having pitched contact edges 184, 184' each having a continuous pitch to frictionally rotatably lock the snap-in seat assembly 168 in position. The pitched contact edges 184, 184' can also include a maximum height edge position 186, 186' located at the position of maximum height contact of both of the first and second claw arms 174, 176, which thereby defines the locked position. After the initial installation of snap-in seat assembly 168 in a seat assembly installation direction "E", the snap-in seat assembly 168 is axially rotated until the barb flats 180, 180' reach the maximum height edge position 186, 186' of the pitched contact edges 184, 184'. There is therefore no clearance gap provided at the contact point 187 between seat assembly body 170 and body end portion 172 at the locked position.

Figure 9:
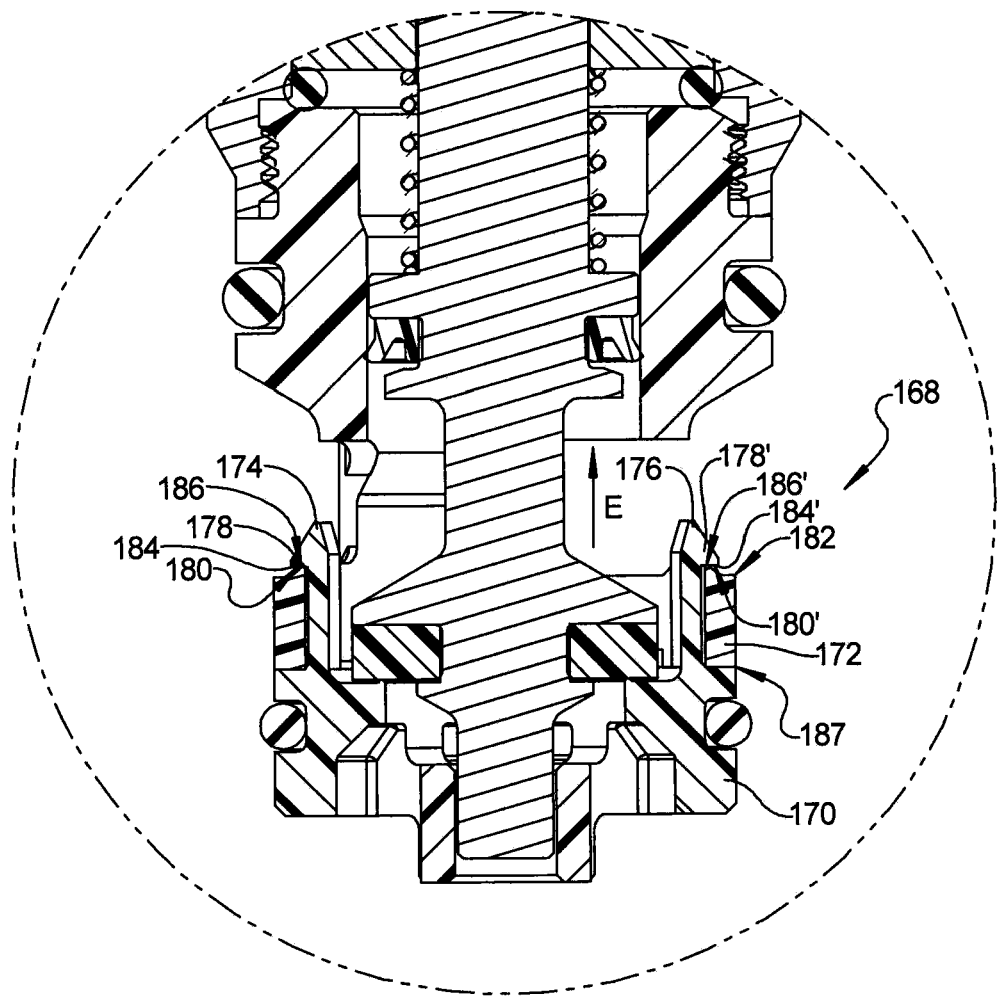
FIG. 9 is a cross sectional side elevational view of area 9 of FIG. 8.
Figure 10:
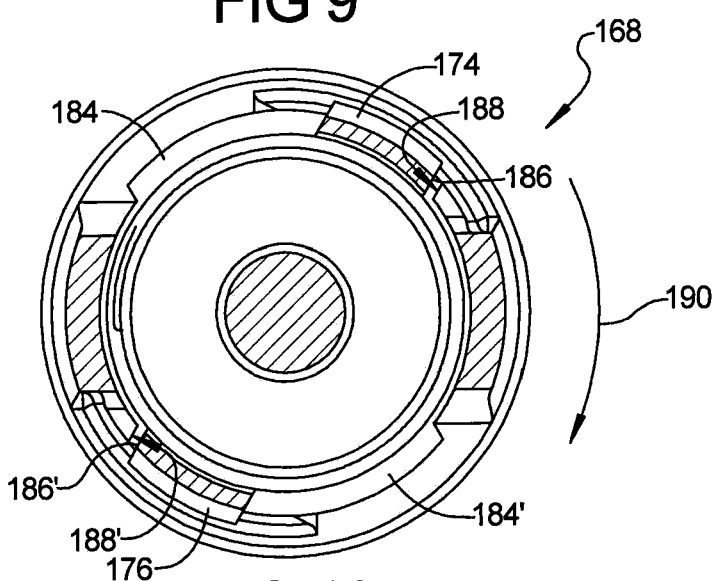
FIG. 10 is a cross sectional top plan view taken at section 10 of FIG. 8.

Referring to FIG. 10 and again to FIGS. 8-9, first and second rotation stops 188, 188' act as positive rotation stops for the first and second claw arms 174, 176 as the snap-in seat assembly 168 is rotated in an installation rotation direction 190, such as the clockwise rotation direction shown. The first and second rotation stops 188, 188' can be provided in addition to the maximum height edge positions 186, 186' to act as a rotation position lock for the snap-in seat assembly 168.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular valve, comprising:
   a solenoid body;
   a pole piece disposed within the solenoid body;
   a coil disposed within the solenoid body;
   a valve body cartridge connected to the solenoid body, the valve body cartridge including a body end portion that is spaced from the rest of the valve body cartridge by an inlet port;
   an armature/valve member slidably disposed with respect to both the solenoid body and the valve body cartridge that is displaced with respect to the pole piece when the coil is energized;
   a snap-in seat assembly having:
      at least one claw arm that engages the valve body cartridge to retain the snap-in seat assembly in direct contact with the valve body cartridge; and
   the at least one claw arm having a longitudinal length that is longer than the body end portion such that the snap-in seat assembly is moveable longitudinally relative to the valve body cartridge when the at least one claw arm is engaged with the valve body cartridge, wherein the snap-in seat assembly is spaced from the body end portion of the valve body cartridge when the modular valve is in a non-installed condition to provide a clearance gap between the snap-in seat assembly and the body end portion of the valve body cartridge, and wherein the snap-in seat assembly abuts the body end portion of the valve body cartridge when the modular valve is in an installed condition to close the clearance gap.

2. The modular valve of claim 1, wherein the solenoid body further includes a bobbin supporting the coil and having the pole piece slidably received in the bobbin.

3. The modular valve of claim 2, wherein the pole piece is movably positioned in the bobbin and further includes a threaded end engaging the pole piece to the solenoid body permitting an axial position of the pole piece to be selected by rotation of the pole piece with respect to the threaded end.

4. The modular valve of claim 1, wherein the at least one claw arm has a barb and the body end portion of the modular valve body cartridge includes a barb engagement face having a pitched contact edge.

5. The modular valve of claim 4, wherein the pitched contact edge has a continuous pitch directly contacted by the barb of the at least one claw arm to frictionally lock the snap-in seat assembly to the valve body cartridge.

6. The modular valve of claim 5, wherein the pitched contact edge includes a maximum height edge position located where the at least one claw arm contacts the pitched contact edge thereby defining the locked position.

7. The modular valve of claim 4, wherein after initial installation of the snap-in seat assembly in a seat assembly installation direction co-axial with respect to a longitudinal central axis of the modular valve, the snap-in seat assembly is rotated about the longitudinal central axis until a barb flat of the barb of the at least one claw arm reaches a maximum height edge position of the pitched contact edge.

8. The modular valve of claim 4, wherein the body end portion further includes a rotation stop that engages the at least one claw arm of the snap-in seat assembly as the snap-in seat assembly rotates about a longitudinal central axis.

9. The modular valve of claim 1, wherein the snap-in seat assembly includes a seat engagement face that defines a valve closed position when the seat engagement face is contacted by a valve seal member supported on the armature/valve member and a valve open position when the coil is energized and the valve seal member is displaced away from the seat engagement face.

10. The modular valve of claim 1, wherein the modular valve is a 2-way valve.

11. The modular valve of claim 1, wherein the modular valve is a 3-way valve.

12. The modular valve of claim 4, further including a manifold having a manifold bore receiving the modular valve and a modular bore end face, wherein the clearance gap between the snap-in seat assembly and the valve body cartridge is eliminated when direct contact occurs between a seat body end face of the snap-in seat assembly and the manifold bore end face.

13. The modular valve of claim 12, wherein a barb clearance gap is created between the barb of the at least one claw arm and the body end portion of the valve body cartridge when the clearance gap between the snap-in seat assembly and the valve body cartridge is eliminated.

14. A modular valve, comprising:
a solenoid body;
a pole piece disposed within the solenoid body;
a coil disposed within the solenoid body;
a valve body cartridge connected to the solenoid body;
a snap-in seat assembly having:
   at least one claw arm having a barb that engages the valve body cartridge to retain the snap-in seat assembly in direct contact with the valve body cartridge;
   a seat engagement face that defines a valve closed position when the seat engagement face is contacted by a valve seal member and a valve open position when the coil is energized and the valve seal member is displaced away from the seat engagement face; and
the valve body cartridge including a body end portion presenting a barb engagement face having a pitched contact edge, the pitched contact edge having a continuous pitch that undercuts the barb of the at least one claw arm giving the pitched contact edge a pointed cross-sectional shape that contacts the barb to rotatably and frictionally lock the snap-in seat assembly to the valve body cartridge.

15. The modular valve of claim 14, further including an armature/valve member slidably disposed in both the solenoid body and the valve body cartridge, the armature/valve member being displaced toward the pole piece when the coil is energized.

16. The modular valve of claim 15, wherein the snap-in seat assembly includes a guide tube slidably receiving a valve member guide of the armature/valve member.

17. The modular valve of claim 15, wherein the valve seal member is supported on the armature/valve member between a first and a second seal retention flange, the first and the second retention flanges integrally connected to the armature/valve member and radially extending from the armature/valve member.

18. The modular valve of claim 15, further including a biasing member acting to bias the armature/valve member toward the snap-in seat assembly and create a clearance gap between the snap-in seat assembly and the valve body cartridge in a non-installed condition of the modular valve.

19. A solenoid operated modular valve, comprising:
a solenoid body;
a pole piece disposed within the solenoid body;
a coil disposed within the solenoid body;
a valve body cartridge adjacent the solenoid body;
an armature/valve member slidably disposed with respect to both the solenoid body and the valve body cartridge that is displaced with respect to the pole piece when the coil is energized;
a snap-in seat assembly having:
   at least one claw arm that engages the valve body cartridge to retain the snap-in seat assembly in contact with the valve body cartridge;
   a seat engagement face that defines a valve closed position when the seat engagement face is contacted by a valve seal member supported on the armature/valve member and a valve open position when the coil is energized and the valve seal member is displaced away from the seat engagement face; and
a biasing member acting to bias the armature/valve member toward the seat engagement face and create a clearance gap between the snap-in seat assembly and the valve body cartridge in a non-installed condition of the modular valve.

20. The solenoid operated modular valve of claim 19, wherein the armature/valve member further includes a piston slidably received in a piston bore of the valve body cartridge.

21. The solenoid operated modular valve of claim 19, wherein the snap-in seat assembly further includes an outlet bore and a pressure balanced condition of the modular valve is created when a diameter of the outlet bore is equal to a diameter of the piston bore.

22. The solenoid operated modular valve of claim 19, wherein the snap-in seat assembly further includes an outlet bore and a non-pressure balanced condition of the modular valve is created when a diameter of the outlet bore is less than a diameter of the piston bore.

23. The solenoid operated modular valve of claim 19, further including a cushion member of a resilient material positioned between an armature end face of the armature/valve member and a pole piece end face of the pole piece that prevents direct contact between the armature/valve member and the pole piece.

24. The solenoid operated modular valve of claim 23, wherein an axial position of the pole piece is selected when the cushion member is in position to define a valve stroke length.

* * * * *